Patented Mar. 7, 1939

2,149,275

UNITED STATES PATENT OFFICE 2,149,275

RESIN MANUFACTURE

William H. Carmody, Pittsburgh, Pa., assignor to The Neville Company, Pittsburgh, Pa., a corporation of Pennsylvania No Drawing. Application September 23, 1937, Serial No. 165,313

5 Claims. (Cl. 196—75)

This invention relates to the production of resins from still residues produced in the recovery of aromatic light oils derived from the high temperature carbonization of coal in by-product coke ovens.

The aromatic light oils present in the coke-oven gases are usually scrubbed out with a mineral oil, thus producing a solution of the light oils in the wash oil. This solution is then distilled to obtain a mixture of light oils which is fractionated to obtain impure cuts of the individual oils, and these are then subjected to distillation in the so-called "pure stills" to obtain purified solvent fractions.

These operations result in production of residues which are known in the trade as "pure still residues". These residues comprise mixtures of resins and oils in varying amounts, depending, for example, on the degree to which the solvents have been stripped out in distillation. These still residues have been of low market value, and generally they have been disposd of by adding them to coke oven tar, or burned as a fuel, no profitable mode of handling them being known.

In my copending application Serial No. 85,747, filed June 17, 1936, I have disclosed and claimed a process of treating such still residues to recover products of increased value therefrom. In accordance with that invention the still residues heated to at least about 250° C. are steam distilled to strip them of high boiling oils, and to obtain a black resinous residue constituting, generally, about 40 per cent of the still residue. The resin produced has properties which make it desirable for certain commercial uses, as is brought out in my aforesaid application, such as a melting point ranging from room temperature to 150° C., depending on the thoroughness with which the oils are removed.

The oils from which pure still residues result are customarily washed with strong sulfuric acid to polymerize the unsaturated substances present, with production of high boiling oils and resins, some of which appear in the still residues. The acid is then separated in a sludge which removes all but small quantities of acid from the washed oil. Heretofore this sludge has constituted a waste material, it being disposed of by burning or in other convenient ways.

Since small quantities of acid remain dispersed in the washed oil, it is neutralized with soda solution in some cases, or, more commonly by lime, which is available as well as cheap. Lime in the proportion of about 0.25 per cent of the oil is allowed to remain therein to reduce corrosion of the equipment in which it is treated subsequently. When the mixture is distilled to obtain commercially pure cuts of the light oils the lime becomes concentrated in the still residues, amounting to as much as 6 per cent or more of the pure still residues.

Distillation of the residues in accordance with the process of my aforesaid application causes further concentration of this mineral matter, or ash, in the resin. For example, a resin produced in this manner and having a 150° C. melting point may have an ash content of from 18 to 20 per cent. For some uses the ash may act as a filler and not be objectionable. However, the ash gives the resin a dull, brownish black color and a granular fracture, which thus injures its appearance and limits its use because in such resins an inherent shiny, bright fracture is desired.

Moreover, the lime may be present, at least in part, in hydrated form, and its solubility is often objectionable while the resultant alkalinity of the resin is also undesirable in some instances. Attempts have been made to eliminate the ash from the still residues but they have been unsuccessful in that they were too slow, or too expensive for use in the production of an inexpensive commercially successful final product.

The general object of this invention is to produce from pure still residues a resin having improved physical and chemical properties and of reduced ash content, as compared with the pure still residue resins produced heretofore.

Another object of the invention is to utilize pure still residues and light oil acid sludge for producing a new and improved resin.

These and other objects will appear from the following description.

This invention is predicated upon my discovery that a resin having desirable physical properties and appearance, and free from objectionable characteristics of prior pure still residue resins, can be produced by mixing pure still residue with the acid sludge obtained in the acid washing of crude light oil or its cuts, and then subjecting the mixture to steam distillation at elevated temperatures to drive off the volatile material therein and to recover resin as a residue.

In the acid washing of the crude cuts of light oils, a large amount of the acid is destroyed and escapes as sulfur dioxide after it has oxidized or polymerized the unsaturated compounds present. Sufficient acid remains in the sludge in both the free and the combined form to make the sludge decidedly acidic. Hydrocarbons in the form of oils or high melting resinous polymers which were mechanically trapped and carried down in the sludge comprise the remainder of the sludge. If this sludge be steam distilled to strip out the oils there is obtained up to about 50 per cent of resin which is black and of high melting point, e. g. up to 200° C. This resin is not acidic.

By steam distilling a mixture of such acid sludge and pure still residues I obtain a resin free from the objectionable characteristics of resin produced from still residues alone. The resin is jet black in color and exhibits a brilliant, normal resin-like fracture, while the ash content is only about half that normally encountered in resin from pure still residues, and, in addition, the ash has been transferred to a water-insoluble form. As an added feature, there are recovered hydrocarbon oils which have heretofore been lost in the sludge.

While the two materials may be mixed in various proportions, suitable results are had for most purposes by mixing the sludge and still residue in substantially equal proportions by volume. The distillation may be effected by heating the mixture to render it liquid, say to 250° C. or higher, and passing live steam into it until the oils have been stripped out sufficiently to produce resin of the desired melting point.

A specific and typical example of the process is as follows: 250 grams of acid sludge produced in regular operation of the by-product coke plant at Clairton, Pennsylvania, were mixed with 250 grams of pure still residue from the same source. The mixture was heated to between 260° and 280° C., and steam distilled at that temperature to produce 235 grams of a dark brown resin having a melting point of 105° C. and an ash content of 7.8 per cent. The resin was transparent in thin layers and, surprisingly, its fracture was brilliant and of genuine resin appearance even though it was high in ash. The product was brighter and glossier than resins obtained solely from still residues. Thus the presence of the ash has effectively been masked by production in accordance with the invention so that the resin does not suggest too great a deviation from its expected properties and presents the attractive appearance demanded in most instances.

A further advantage of the process is that by mixing the acid sludge with the alkaline still residue a portion of the lime present is transformed into insoluble calcium sulfate which makes the resin substantially impervious to water. The process also unexpectedly results in greater yields of resin than obtained from the processing of either acid sludge or still residue alone, thereby aiding in making the process commercially successful.

In producing resins from still residues, the oils therein are rather difficult to remove to the extent necessary to produce a high melting resin. This is partly due to the rather low molecular weight resin originally in the still residue. In contrast to this, the sludge contains smaller volumes of the same type of oils mixed with highly polymerized resins which have considerably higher melting points. Thus the same melting point is reached more quickly, i. e., with shorter distillation, or higher melting points are attained more easily. By combining the sludge and still residues the distillation cost per unit weight is reduced and greater resin recovery results than if still residues alone were used. Of greater significance is the fact that a heretofore waste material has been utilized in producing these results.

It will be appreciated that the distillation conditions are not fixed but may vary with the specific mixture being distilled, or with the properties desired in the final product. Thus the distilling temperature may be raised or the time lengthened if denser higher melting resins are desired.

According to the provisions of the patent statutes, I have explained my invention and have described what I now consider its best embodiment. However, I desire to have it understood that, within the scope of the appended claims, the invention may be practiced otherwise than as specifically described.

I claim:

1. That method of producing resins, comprising mixing acid sludge and pure still residues resultant, respectively, from acid washing and fractionation of light oils produced in by-product coking of coal, and distilling the mixture to remove oils therefrom and leave a residue of resin of brilliant appearance and fracture and containing the inorganic ash content of said still residues.

2. That method of producing resins, comprising mixing substantially equal volumes of acid sludge and pure still residues resultant, respectively, from acid washing and fractionation of light oils produced in by-product coking of coal, and steam distilling the mixture to remove oils therefrom and leave a residue of resin of brilliant appearance and fracture and containing the inorganic ash content of said still residues.

3. That method of producing resins, comprising mixing acid sludge and pure still residues resultant, respectively, from acid washing and fractionation of light oils produced in by-product coking of coal, and distilling the mixture to remove oils therefrom and leave a residue of resin having brilliant appearance and fracture and containing the inorganic ash content of said still residues, and continuing such distillation to produce resin of desired melting point.

4. That method of producing resins, comprising mixing substantially equal quantities by weight of acid sludge and pure still residues resultant, respectively, from acid washing and fractionation of light oils produced in by-product coking of coal, and steam distilling the mixture at a temperature from about 260° C. to about 280° C. to remove oils therefrom and leave a residue of resin of brilliant appearance and fracture and containing the inorganic ash content of said still residues.

5. As a new article of manufacture, a bright, glossy, dark brown resin obtained as a residue in distilling mixtures of acid sludge and pure still residues resultant, respectively, from acid washing and fractionation of light oils produced in by-product coking of coal, the resin having a melting point of at least about 105° C., containing the inorganic ash content of said still residues, and having a brilliant fracture.

WILLIAM H. CARMODY.